Jan. 2, 1934.  A. ZENO  1,942,268
SIGNALING DEVICE
Filed Sept. 28, 1932
Fig. 1.
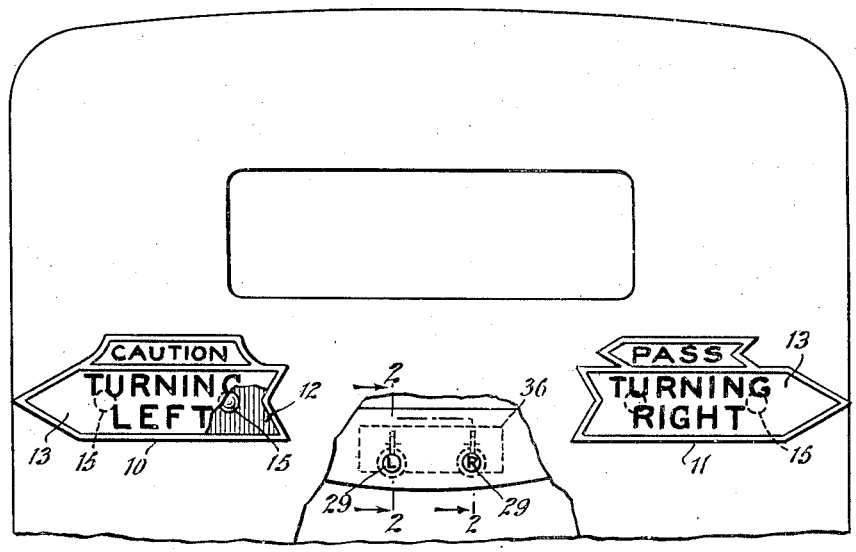
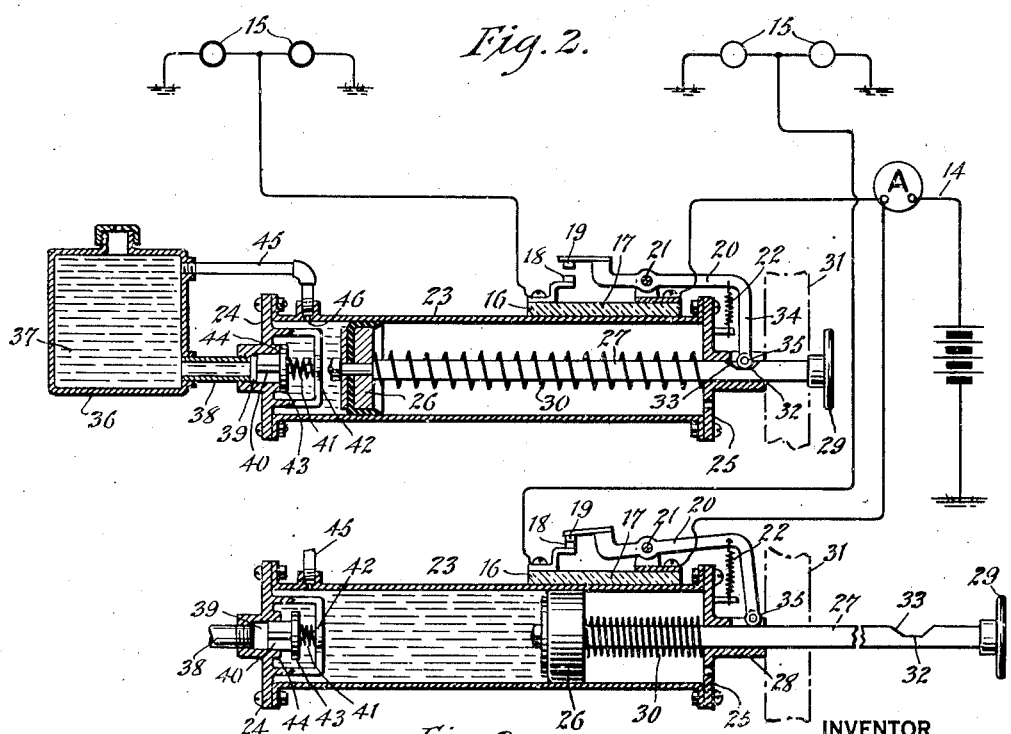
Fig. 2.
Fig. 3.
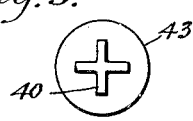
WITNESSES
Edw. Thorpe
Chris Feinle
INVENTOR
Angelo Zeno
BY
Munn & Co.
ATTORNEY Patented Jan. 2, 1934

1,942,268

UNITED STATES PATENT OFFICE 1,942,268

SIGNALING DEVICE

Angelo Zeno, Dobbs Ferry, N. Y.

Application September 28, 1932
Serial No. 635,256

2 Claims. (Cl. 200—34)

This invention relates to a signaling or indicating device for automobiles and other vehicles, and which may be used advantageously for issuing or giving a prolonged signal or indication to the drivers of other automobiles and other vehicles.

An object is the provision of a device of the indicated character which may be manually operated at will to give a signal or indication, and which will operate automatically at a predetermined interval of time after the manual operation to terminate the signal or indication, to the end, that the drivers of following vehicles will have ample notice of the intentions of the driver of the signaling vehicle, and so that the signaling driver can accomplish such signaling by a single operation and be free to attend to the handling of the vehicle in turning to the right or left and for other operations.

The foregoing and other objects which will appear are attained by the combination, construction and operation of the parts hereinafter fully described and illustrated in the accompanying drawing, in which Figure 1 is a view of a portion of an automobile looking toward the rear thereof with the present invention applied thereto;

Fig. 2 is a diagrammatic view shown partly in section, the section being indicated by the line 2—2—2, and Fig. 3 is an end view of the check valve member.

Referring now more particularly to the drawing, it will be apparent that the invention includes one or more signals or indicators, there being two in the present instance designated 10 and 11, each signal or indicator in the present instance consisting of a lamp casing 12 and a translucent panel 13 forming a part of the casing 12. The panel 13 of each signal or indicator has suitable indicia, the panel 13 of the signal 10 having printed or otherwise applied thereto the words "Caution turning left" and the panel 13 of the signal 11 having the words "Pass turning right". These signals or indicators 10 and 11 are mounted on the rear end of the automobile, the signal 10 being at the left side and the signal 11 at the right side, as shown. The invention also includes an electric circuit 14 including electric lamps 15 arranged in each casing 12 to illuminate the panel 13 thereof. A switch 16 is connected in parallel in the circuit 14 and in series with the lamps 15 of each signal or indicator 10 and 11.

The switch 16 is self-opening and consists of an insulator base 17, a fixed contact 18 on the base 17, and a contact 19 on one end of a substantially L-shaped member 20 pivotally mounted, as at 21, on the base 17. The contact 19 is movable into and out of engagement with the contact 18 by the movement of the member 20. A spring 22 is employed in connection with the member 20 to return said member to a normal position in which the contact 19 will be out of engagement with the contact 18. Therefore, it will be apparent that the switch 16 will be normally open to break the circuit 14.

Means for closing each switch 16 is provided. The said means includes a cylinder 23 having a removable head 24 on one end and a removable head 25 on the other end. A piston 26 is movable in the cylinder 23 and has a rod 27 which extends through a bearing 28 on the head 25. The rod 27 is non-circular in cross section to prevent the same from turning. The outer end of the rod 27 has a knob 29 thereon for the purpose of pulling the piston 26 toward the head 25. An expansible coil spring 30 surrounds the rod 27 and has one end thereof in contact with the piston 26 and its other end in contact with the head 25. The spring 30 serves to cause return movement of the piston 26 to a normal position. The piston is limited in its return movement to its normal position by the knob 29 engaging a suitable support, such as the instrument board 31, in relation to which the cylinder 23 is secured. The rod 27 has a recess 32 which provides a cam 33. In the normal position of the piston 26, the recess 32 in the rod 27 will be in such position as to receive the end 34 of the member 20 remote from that having the contact 19. If desired, the end 34 may be provided with a fiber roller 35. When the rod 27 moves outwardly in response to a pull on the knob 29 to move the piston toward the head 25, the roller 35 will ride on the cam 33, thereby rocking the member 20 and causing the contact 19 to be brought into contactual engagement with the contact 18 to close the circuit through the lamps 15, and, at the same time, the spring 30 will be compressed. When the knob 29 is released, the spring will cause the return movement of the piston 26 toward the head 24. When the piston 26 is returned to its normal position, the roller 35 will enter the recess 32, which is caused by the action of the spring 22, thereby moving the contact 19 out of contactual engagement with the contact 18 to open the circuit and thus extinguish the lamps 15.

Means is provided which operates in conjunction with each cylinder 23 and its piston 26 for retarding the opening of the related switch 16. The said means includes a suitable tank 36 containing a supply of liquid, such as oil or glycerine 37. A pipe 38 establishes communication between the lower end of the tank 36 and an inlet passage 39 in the head 24 of the cylinder 23, the passage 39 being in communication with the interior of the cylinder 23. A valve member 40 is slidably supported by the head 24, and a spring 41 is arranged between the valve member 40 and a bridge member 42 carried by the head 24. The valve member 40 has a head 43 movable on and off a seat 44 on the head 24. The spring 41 serves to move the valve member 40 in one direction to bring the head 43 thereon on the seat 44 to prevent return flow of the liquid from the cylinder 23 to the tank 26 through the passage 39 and pipe 38, but allows the liquid to enter the cylinder 23 when the piston 26 is moved toward the head 25. A return-flow connection 45 and bleed hole 46 in the cylinder 23, which establish communication between the interior of the tank 36 and the interior of the cylinder 23, serve to permit the liquid in the cylinder 23 to flow to the tank. It will be apparent that when the piston is moved toward the head 25, liquid will be drawn into the cylinder 23 through the pipe 38 and passage 39 past the valve member 40. At the same time, the switch 16 will be closed to light the lamps 15 to illuminate the related signal or indicating panel 13. This is accomplished by pulling outwardly on the knob 29. When the knob 29 is released, the spring 30 will cause return movement of the piston subject to the retarding action of the liquid. In this manner the switch 16 will be open at a predetermined interval of time after the closing thereof. In this connection it will be observed that the piston rod 27 holds the switch member 20 in circuit-closing position until the piston 26 has reached its normal position. In this manner a prolonged signal or indication of change in the direction of travel may be given by a single manipulation.

Inasmuch as two signals or indicators 10 and 11 are provided, the knobs 29 of the retarding means will be distinguished in any suitable manner, such as by the letters L and R, the knob marked L being manipulated to illuminate the panel 13 of the signal or indicator 10 and the knob marked R being manipulated to perform a similar result in connection with the indicator or signal 11.

I claim:

1. The combination with an electric switch including a pivoted spring actuated contact member; of a slidable actuating member having a notch and cam, and resilient means to cause the reverse movement of said actuating member to a normal position, said contact member entering said notch when said actuating member is in its normal position thereby opening said switch, said cam causing the movement of the contact member thereby closing said switch upon manual direct movement of said actuating member, said actuating member retaining said contact member in switch-closing position while the actuating member is in an advanced position and until said contact member enters said notch upon the restoration of the actuating member to its normal position by the resilient means upon the release of the actuating member.

2. The combination with an electric switch including a pivoted spring actuated contact member; of a slidable actuating member having a notch and cam, resilient means to cause the reverse movement of said actuating member to a normal position, said contact member entering said notch when said actuating member is in its normal position thereby opening said switch, said cam causing the movement of the contact member thereby closing said switch upon manual direct movement of said actuating member, said actuating member retaining said contact member in switch-closing position while the actuating member is in an advanced position and until said contact member enters said notch upon the restoration of the actuating member to its normal position by the resilient means upon the release of the actuating member, and means acting on said actuating member to retard the reverse movement thereof, so that said switch will open at a predetermined interval of time after it is closed.

ANGELO ZENO.